(12) United States Patent
McClintock et al.

(10) Patent No.: US 9,575,979 B1
(45) Date of Patent: Feb. 21, 2017

(54) DETERMINING APPLICATION COMPOSITION AND OWNERSHIP

(71) Applicant: AMAZON TECHNOLOGIES, INC., Reno, NV (US)

(72) Inventors: Jon Arron McClintock, Seattle, WA (US); Shailendra Batra, Bellevue, WA (US); Thibault Candebat, Saint Germain en Laye (FR); Scott Gerard Carmack, Mercer Island, WA (US); Sachin Purushottam Joglekar, Bothell, WA (US); Alun Mark Jones, Woodinville, WA (US); William Frederick Kruse, Seattle, WA (US); Narasimha Rao Lakkakula, Bothell, WA (US); Sunu Aby Mathew, Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 372 days.

(21) Appl. No.: 14/107,950

(22) Filed: Dec. 16, 2013

(51) Int. Cl.
*G06F 17/30* (2006.01)
*G06F 21/62* (2013.01)

(52) U.S. Cl.
CPC ..... *G06F 17/30109* (2013.01); *G06F 21/6218* (2013.01)

(58) Field of Classification Search
CPC ................. G06F 17/30174; G06F 17/30179; G06F 17/30215; G06F 17/30221; G06F 17/30076; G06F 17/30044; G06F 17/30908; G06F 17/30011; G06F 17/30828; G06F 17/30867
USPC ................................................. 707/769, 770
See application file for complete search history.

(56) References Cited

U.S. PATENT DOCUMENTS

| | | | |
|---|---|---|---|
| 2007/0174428 A1* | 7/2007 | Lev Ran | G06F 9/546 709/218 |
| 2007/0226172 A1* | 9/2007 | Tajima | G06F 17/30067 |
| 2008/0228811 A1* | 9/2008 | Drews | G06F 17/30699 |
| 2014/0358870 A1* | 12/2014 | Chambliss | G06F 17/30156 707/692 |

* cited by examiner

*Primary Examiner* — James Trujillo
*Assistant Examiner* — Fariborz Khoshnoodi
(74) *Attorney, Agent, or Firm* — Lindauer Law, PLLC

(57) ABSTRACT

Techniques are described for automatically determining application composition and application ownership of an application that may include a plurality of files deployed to a plurality of host devices. The determination of application composition may be based on analyzing various types of metadata that may provide evidence of associations between deployed files, such as metadata describing the deployment of files to host devices, metadata describing the files tracked within a source control system, or other types of metadata. The determination of application ownership may also be based on analyzing the various types of metadata that provide evidence of associations between files and individuals or groups of individuals within an organization.

20 Claims, 10 Drawing Sheets

DETERMINING APPLICATION COMPOSITION AND OWNERSHIP

BACKGROUND

To support their operations, providers of online services or other computing services may deploy a large number of files across a variety of computing devices that are physically collocated or remote from one another. Such deployments may enable an organization to maintain a quality of service under a variety of operating conditions. However, a complex deployment of a large number of files may create challenges related to resource tracking and auditing, security, quality assurance, or other aspects.

Figure 1:
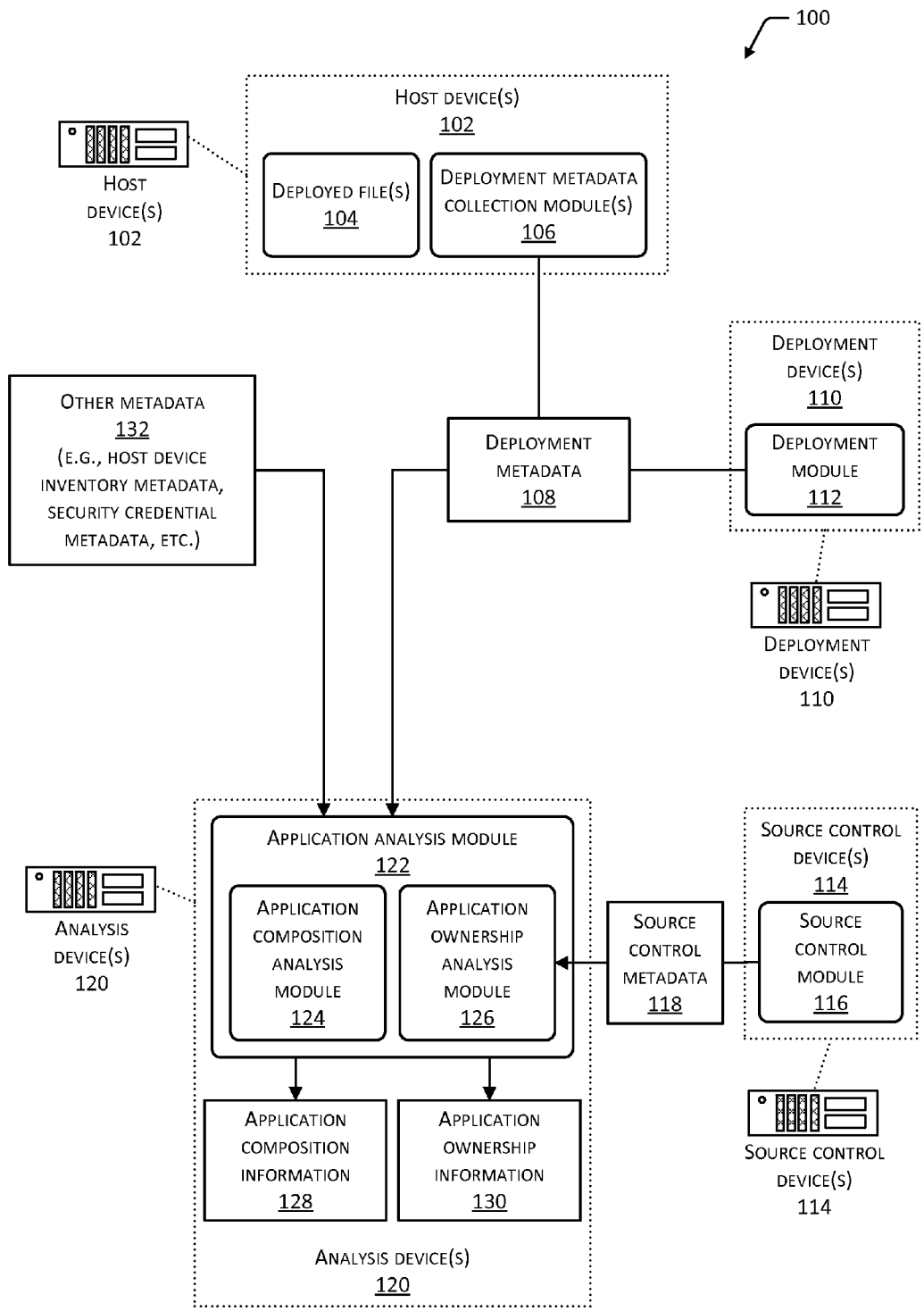
FIG. 1 depicts an environment including one or more analysis devices for automatically determining application composition and ownership based on deployment metadata, source control metadata, or other information.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for automatically determining the composition and ownership of an application that includes a plurality of files deployed to and executing on a plurality of computing devices in a complex computing environment. As described herein, an application may include any number of files arranged according to any format. The files may include compiled, binary, machine-executable files or libraries. The files may also include scripts or batch files that are executable using a runtime, a virtual machine, or an execution engine. In some cases, the files may include source code or intermediate language code such as Java™ programming language bytecodes. The files may also include resources such as text files, data files, images, audio files, graphics files, video files, or any other resources that may be included in an application. In some cases, the files of an application may include security credentials, digital certificates, cryptographic keys, tokens, or other information to ensure confidentiality or integrity of the application, or to control access to the application by users, processes, or devices. The files for an application may also include configuration files describing a configuration of the application, execution parameters or settings, or other data.

An application may be of any scope and may include any number of files deployed on one or more computing devices. For example, an application may be a library loaded into an execution framework, or may be a single compiled executable present on a single computing device. As another example, an application may be a plurality of separate executables performing different tasks of a service such as front-end application programming interfaces (APIs), back-end workflows, maintenance processes, and so forth. The files of an application may be deployed to, installed on, or otherwise present on any number of computing devices or within any number of virtual computing environments (e.g., hypervisors or virtual machines) on a computing device. The files of an application may act in a coordinated manner to perform a related set of operations or functions, including but not limited to data processing, data storage and retrieval, communications, providing information to end users, and so forth.

In a complex computing environment, identifying the files that constitute a particular application may prove challenging. This disclosure describes implementations for identifying one or more files that comprise an application, based on an automated analysis of various types of metadata collected in the environment. The metadata may provide evidence that certain files are associated or related with one another such that they comprise an application. The metadata may include deployment metadata that describes the files have been deployed to one or more computing devices. In some cases, the deployment of two or more files to a same computing device or class of computing devices may provide evidence that the two or more files are part of a same application, particularly in cases where the two or more files are deployed to a single computing device or a single class of computing devices instead of to a broader set of computing devices. The metadata may also include source control metadata that describes check-ins to a source control module or system. For example, the source control metadata may indicate that two or more files are part of a same branch of a source tree, are part of a same check-in, are owned by a same user in the source control system, or have been recently edited by a same user or set of users on a same team. Such information may provide evidence that the two or more files are part of a same application. Implementations may also employ other types of metadata to infer that multiple files are included in an application, as described further below.

In some implementations, different types of metadata may be analyzed to determine whether two or more files are likely to be included in a same application. The results of such an analysis may be presented to one or more users in the form application composition information. In some cases, the application composition information may include a graph, such as a directed graph, that graphically depicts a strength or degree of association between pairs of files that are inferred to be components of an application based on analysis of the metadata.

Implementations may also automatically determine the ownership of an application based on various types of metadata. As described herein, an owner of an application may include any number of individuals, or any number of sets of individuals (e.g., teams). An owner of an application may include personnel who are at least partly responsible for designing, developing, deploying, or maintaining the application. Accordingly, an owner may include any number of personnel who are informed when the application experiences a failure or a security breach, or any number of personnel who bear responsibility for the risk of such problems. By determining application composition and ownership in a computing environment, implementations enable the identification of ownership or responsibility boundaries between different owners, ensure maintainability and operational support for applications, and enable other processes such as security reviews and audits.

Implementations may identify a plurality of files that are included in, or that are components of, an application based on analyzing various types of metadata regarding the files. Implementations may also identify one or more owners (e.g., individuals or teams) of an application, based on analyzing the information regarding individuals or teams associated one or more files of the application, as described in one or more types of metadata. As described herein, the metadata may be analyzed to determine a relationship, association, connection, correspondence, or similarity between files or between users associated with the files.

FIG. 1 depicts an environment 100 including one or more host devices 102. The host device(s) 102 may each include any number of deployed files 104 that have been installed on, deployed to, or that are otherwise present in memory on the host device(s) 102. As described above, the deployed file(s) 104 may include any type or format of file, and may include any type of information that may be employed by or included in an application. The deployed file(s) 104 may include machine-executable binaries, libraries, source code modules, APIs, resource files, executable scripts in text files, security credentials or certificates, and so forth.

The host device(s) 102 may comprise any type of computing device, including but not limited to a server computer, a personal computer, a workstation computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the host devices 102 may comprise a cluster, cloud, farm, or other grouping of multiple devices that coordinate operations to provide load balancing, failover support, parallel processing capabilities, shared storage resources, or other aspects. In some cases, the host device(s) 102 may include substantially mobile devices such as user devices, or substantially less mobile computing devices. In some cases, the host device(s) 102 may host the deployed file(s) 104 to provide any number or type of computing services to end users. The host device(s) 102 are described further with reference to FIG. 5.

In some implementations, the host device(s) 102 may execute one or more deployment metadata collection module(s) 106. The deployment metadata collection module(s) 106 may periodically or continuously execute to gather deployment metadata 108 that describes the software that is deployed to or executing on the host device(s) 102. For example, the deployment metadata 108 may identify one or more deployed files 104 deployed to a host device 102. In some implementations, the deployment metadata 108 may be generated on one or more deployment server device(s) 110 that execute a deployment module 112. The deployment module 112 may perform operations for building the deployed file(s) 104, including compiling source code files to generate object code files, and linking the object code files to generate deployed files 104 that are binary executables or libraries. The deployment module 112 may also perform operations for deploying the deployed files 104 to the host device(s) 102, including copying the deployed files 104 to the host device(s) 102 or installing the deployed files 104 on the host device(s) 102. In some cases, the deployment module 112 may execute any number of build or deployment scripts or programs to perform build and deployment operations. The deployment device(s) 110 may include any type of computing device, including but not limited to those types of computing devices listed above with reference to the host device(s) 102. In some cases, two or more of the deployment devices 110 may comprise a cluster, cloud, farm, or other grouping of multiple devices that coordinate operations to provide load balancing, failover support, parallel processing capabilities, shared storage resources, or other aspects. An example of the deployment metadata 108 is described further with reference to FIG. 6.

The environment 100 may also include one or more source control devices 114 that execute a source control module 116. The source control device(s) 114 may include any type of computing device, including but not limited to those types of computing devices listed above with reference to the host device(s) 102. The source control module 116 may perform operations to enable one or more source control users to register files in a source control system, to check out files for editing or other modification, and to check in modified versions of files. The source control module 116 may track changes made to files by one or more users over time, and enable different versions of a file to be compared or merged. The source control module 116 may generate source control metadata 118 that describes the changes made to one or more of the deployed files 104 that are stored and tracked using the source control system. The source control metadata 118 may describe check-ins of files, the users who made the check-ins, the dates and times on which the check-ins were made, and the changes made to the files that were checked in. The source control metadata 118 may also describe, for one or more files, one or more source control users who are designated as owner(s) of the file. In some cases, the source control module 116 may store and track changes to source code files that may be built by the deployment module 112 to generate binary, machine-executable files. Such binary files may then be deployed as the deployed files 104. Alternatively, the source control module 116 may store and track changes to the deployed files 104. Implementations support the use of any source control module 116 that provides a source control system or revision control system. For example, the source control module 116 may be the Perforce™ revision control system, provided by Perforce Software™, Inc. of Alameda, Calif., USA. In some cases, two or more of the source control devices 114 may comprise a cluster, cloud, farm, or other grouping of multiple devices that coordinate operations to provide load balancing, failover support, parallel processing capabilities, shared storage resources, or other aspects.

The environment 100 may also include one or more analysis devices 120. The analysis device(s) 120 may include any type of computing device, including but not limited to those types of computing devices listed above with reference to the host device(s) 102. In some cases, two or more of the analysis devices 120 may comprise a cluster, cloud, farm, or other grouping of multiple devices that coordinate operations to provide load balancing, failover support, parallel processing capabilities, shared storage resources, or other aspects. An example of the analysis device(s) 120 is described further with reference to FIG. 4.

The analysis device(s) 120 may execute an application analysis module 122. The application analysis module 122 may access the deployment metadata 108, the source control metadata 118, or other metadata. Based on analysis of the various types of metadata, the application analysis module 122 may automatically determine one or more deployed files 104 that are components of an application. The application analysis module 122 may also automatically determine one or more individuals or groups of individuals (e.g., team(s)) that may be designated as owners of the application, based on various users who are associated with the deployed files 104 of the application according to the various types of metadata. In some implementations, the application analysis module 122 may include an application composition analysis module 124 and an application ownership analysis module 126 that perform operations to respectively determine application ownership and composition. Although the application composition analysis module 124 and the application ownership analysis module 126 are depicted in FIG. 1 as sub-components, sub-modules, or sub-processes of the application analysis module 122, implementations are not so limited. In some implementations, one or both of the application composition analysis module 124 and the application ownership analysis module 126 may operate as separate modules relative to the application analysis module 122.

The application analysis module 122, or its sub-components, may generate application composition information 128 and application ownership information 130. The application composition information 128 may describe one or more deployed files 104 that are determined to be components of a same application. In some cases, the application composition information 128 may also describe a likelihood that the deployed file(s) 104 are part of the application, as a relationship metric that describes an extent to which pairs of deployed files 104 are related based on the metadata. An example of the application composition information 128 is described further with reference to FIG. 3. The application ownership information 130 may list one or more users or groups of users (e.g., team(s)) that are determined to be owners of an application. Operations of the application analysis module 122, the application composition analysis module 124, and the application ownership analysis module 126 are described further with reference to FIGS. 8-10.

In some implementations, the determination of application composition and ownership may be based on other metadata 132. Such other metadata 132 may include host inventory metadata that describes a number, type, and identify of the host device(s) 102 present in the environment 100. Host inventory metadata may identify hostnames of the host device(s) 102, the host classes with which the host device(s) 102 are associated, and one or more users who are designated as owners or responsible parties with regard to the host device(s) 102. The other metadata 132 may also include security credential metadata, describing the assignment of security credentials to users, processes, or devices. Such security credentials may include logins, passwords, digital certificates, tokens, cryptographic keys, or other information that enables users, devices, or processes to access secured hardware or software systems. The other metadata 132 may also include load balancing configurations for load balancing among multiple host devices 102. In some cases, the other metadata 132 may include issue tracking information, such as trouble tickets or bug tracking data. The other metadata 132 may also include file deployment or ownership information that has been manually collected from users.

The host device(s) 102 depicted in FIG. 1 may perform any number of software hosting or software providing roles within the environment 100. In some cases, the host device(s) 102 may include backend server devices or content server devices that generate data to be served to end users connecting to the host device(s) 102 using client devices. The host device(s) 102 may also include intermediate server devices or edge server devices that receive and process requests for information, and send them on to one or more content servers or backend servers. In some cases, the host device(s) 102 may include cache servers that locally store information to be served to end users. In some cases, the host device(s) 102 may include user devices operated by individuals of an organization that manages the deployment, development, and maintenance of software. For example, the host device(s) 102 may include user workstations, mobile devices (e.g., smartphones, tablet computers), and so forth. Moreover, although the host device(s) 102, the deployment device(s) 110, the source control device(s) 114, and the analysis device(s) 120 are depicted in FIG. 1 as separate computing devices, implementations are not so limited. In some cases, at least some of the operations, functions, or modules of these computing devices may be executed on one or more computing devices. For example, in some cases, the source control module 116 and the deployment module 112 may execute on a same computing device or cluster of computing devices.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 2:
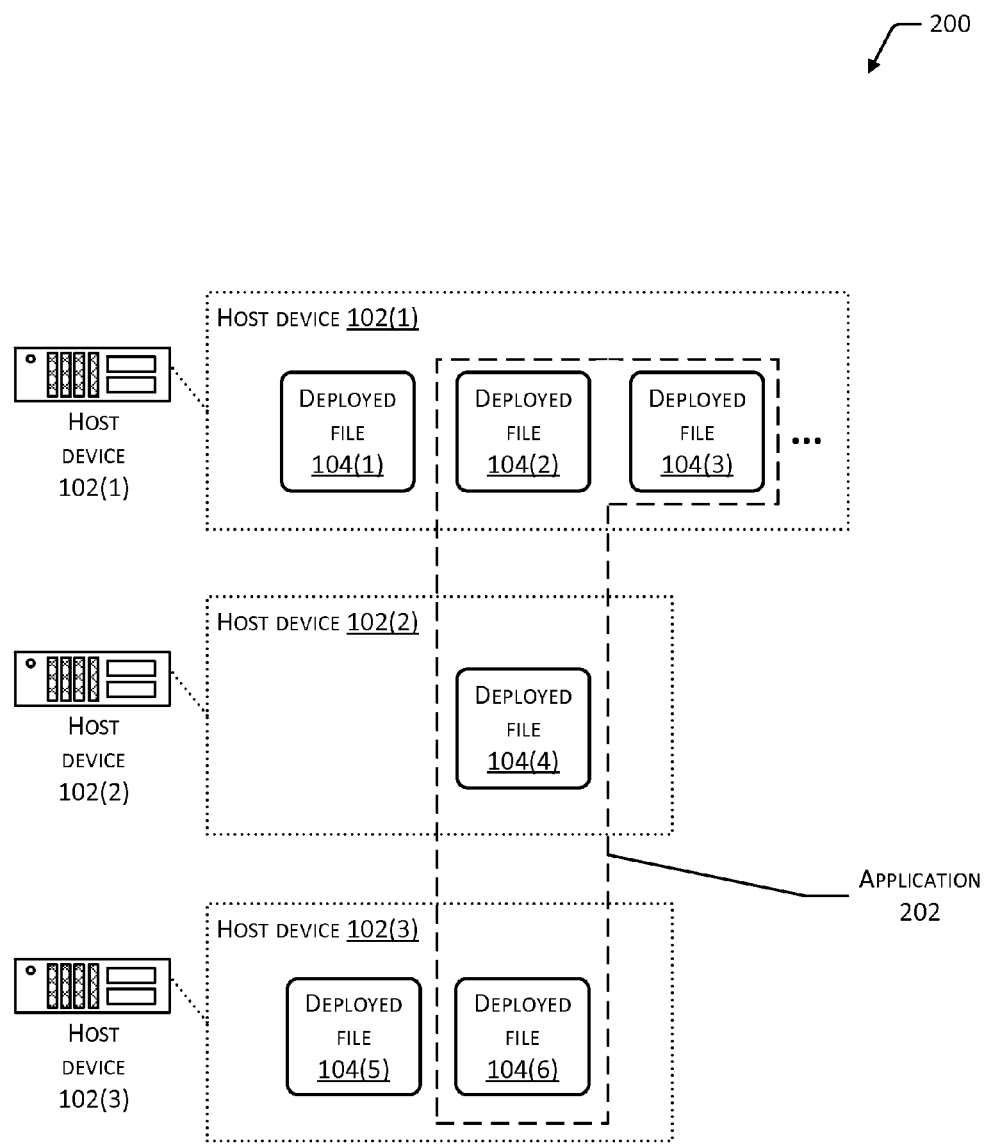
FIG. 2 depicts a schematic of three example host devices to which various files have been deployed, a subset of the deployed files being included in an application.

FIG. 2 depicts a schematic 200 of three example host devices 102 to which various deployed files 104 have been deployed. In the example of FIG. 2, the host device 102(1) has at least three deployed files 104, the host device 102(2) has a single deployed file 104, and the host device 102(3) has two deployed files 104. As described further herein, the analysis device(s) 120 may perform operations to identify a plurality of deployed files 104 that constitute an application 202. In the example shown, the application 202 includes deployed files 104 that are deployed to different host device(s) 102. As such, implementations may operate to define a boundary of the application 202 across any number of host device(s) 102 that may be geographically remote or collocated. Moreover, although the examples herein describe deployed files 104 that are deployed to any number of host device(s) 102 that are physical server devices, implementations are not so limited. Implementations may also operate to identify an application 202 that includes any number of deployed files 104 that are deployed to any number of virtual programming environments such as hypervisors, virtual machines, computing environment emulations, cloud computing environments, or distributed computing environments. Accordingly, the host device(s) 102 described herein may refer to logically separate virtual computing environments within a physical device as well as to physically separate computing environments.

Figure 3:
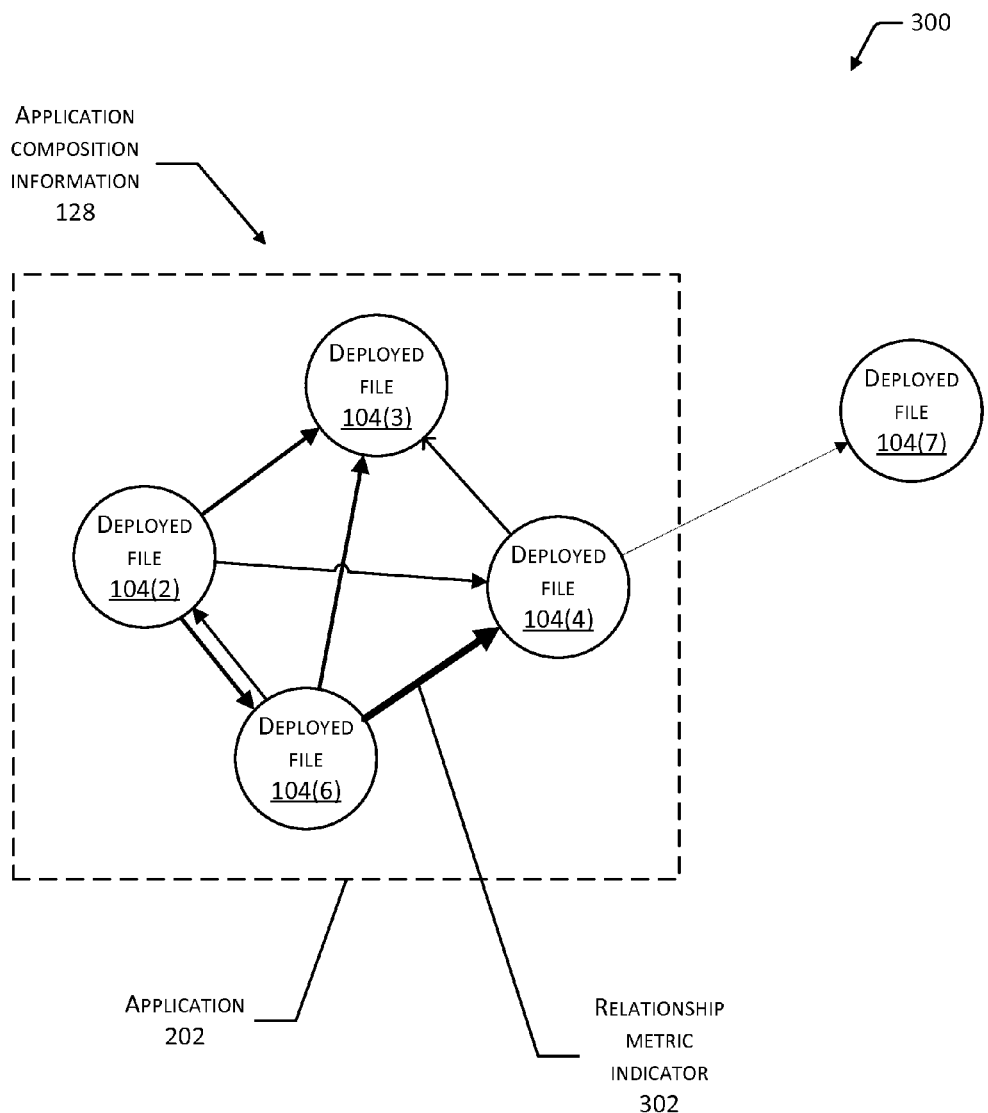
FIG. 3 depicts a schematic of example application composition information, including a graph that depicts a plurality of deployed files determined to be components of an application, and that depicts a relationship metric indicator showing a degree of relationship between deployed files.

FIG. 3 depicts a schematic 300 of an example of the application composition information 128. In this example, the application composition information 128 is provided in the form of a graph that depicts a plurality of deployed files 104 determined to be components of the application 202, as described with reference to FIG. 2. The graph also shows the relationships between pairs of the deployed files 104 determined to be part of the application 202. In some cases, as shown in FIG. 3, the application composition information 128 may graphically depicts a strength or degree of the relationship between pairs of the deployed files 104. In the example of FIG. 3, this relationship metric indicator 302 is included as a thickness of a line connecting a pair of deployed files 104, and a thicker line may indicate a stronger relationship between the connected deployed files 104. In the example shown, the line connecting deployed files 104(4) and 104(6) is thicker than the line connecting deployed files 104(3) and 104(4), which may indicate a relationship metric indicator 302 that is greater between deployed files 104(4) and 104(6) than that between deployed files 104(3) and 104(4). The determination of the relationship strength between pairs of deployed files 104 is described further with reference to FIG. 8. Although FIG. 3 depicts the application composition information 128 as a graph, implementations may provide the application composition information 128 in any format or as any type of data. For example, in some cases the application composition information 128 may be provided as a list of deployed files 104 included in the application 202, with the relationship metric indicator 302 provided as a quantitative measure (e.g., a number) or as a qualitative indication (e.g., as a strong, medium, or weak relationship).

In some implementations, the relationship metric indicator 302 may also indicate a direction of the relationship between a pair of deployed files 104. As shown in FIG. 3, the relationship metric indicator 302 may include an arrow or other graphical feature describing a directional of the relationship. In some cases, as shown in the example between deployed files 104(2) and 104(6), the strength of a relationship between two deployed file(s) 104 in one direction may be different that the strength in the opposite direction. For example, a presence of a deployed file 104 in the application 202 may lead to a strong inference that another deployed file 104 is to be included in the application 202. In some implementations, the application composition information 128 may also describe one or more deployed files 104 that were determined to not be components of an application 202. In the example of FIG. 3, the deployed file 104(7) is weakly related to the deployed file 104(4), but the relationship is not sufficiently strong to include the deployed file 104(7) in the application 202.

In some implementations, determining a degree or strength of a relationship between two deployed files 104 may include calculating a correlation between the two deployed files 104 based on one or more types of the metadata described herein. For example, determining a correlation may include calculating a Pearson correlation coefficient describing a confidence of correlation (e.g., on a scale from 0 to 1) of two deployed files 104. In such cases, the correlation confidence may be employed as the relationship metric 302. Some implementations may employ one or more association rule algorithms for generating association rules to be employed to determine correlation between two deployed files 104. Employed association rule algorithms may include, but are not limited to, any of the following: the Apriori algorithm, the Eclat algorithm, the FP-growth algorithm, the General Unary Hypotheses Automaton (GUHA) procedure ASSOC, or the Optimized Pruning for Unordered Search (OPUS) algorithm.

Figure 4:
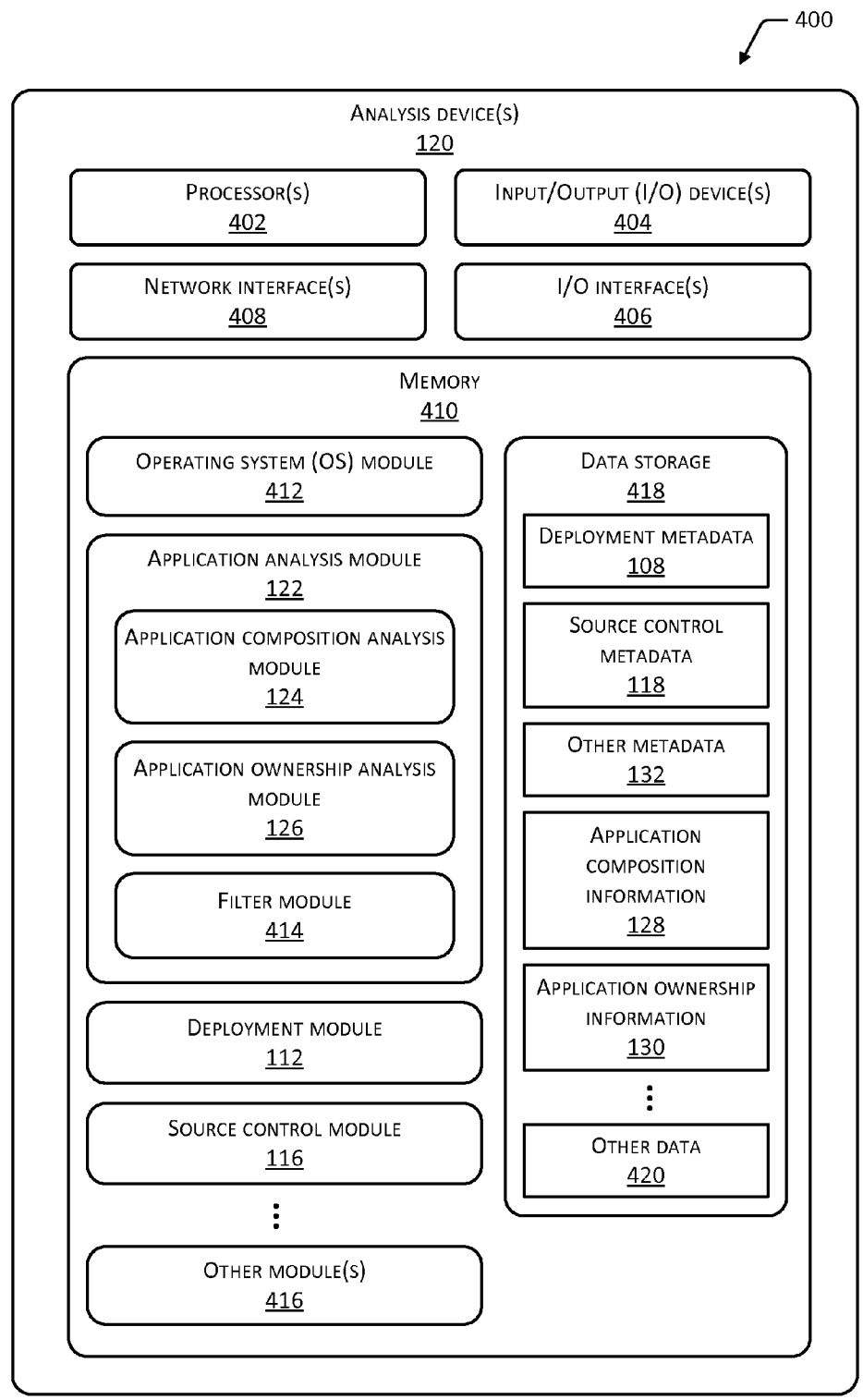
FIG. 4 depicts a block diagram of an example analysis device that is configured to perform operations to automatically determine application composition and ownership.

FIG. 4 depicts a block diagram 400 of an example of the analysis device(s) 120. As shown in the block diagram 400, the analysis device 120 may include one or more processors 402 configured to execute one or more stored instructions. The processor(s) 402 may comprise one or more cores.

The analysis device 120 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the analysis device 120, or may be externally placed.

The analysis device 120 may include one or more I/O interfaces 406 to enable components or modules of the analysis device 120 to control, interface with, or otherwise communicate with the I/O device(s) 404. The I/O interface(s) 406 may enable information to be transferred in or out of the analysis device 120, or between components of the analysis device 120, through serial communication, parallel communication, or other types of communication. For example, the I/O interface(s) 406 may comply with a version of the RS-232 standard for serial ports, or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The analysis device 120 may also include one or more busses or other internal communications hardware or software that allow for the transfer of data between the various modules and components of the analysis device 120.

The analysis device 120 may include one or more network interfaces 408 that enable communications between the analysis device 120 and other network accessible computing devices, such as the host device(s) 102, the deployment device(s) 110, or the source control device(s) 114. The network interface(s) 408 may include one or more network interface controllers (NICs) or other types of transceiver devices configured to send and receive communications over a network.

The analysis device 120 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the analysis device 120. In some implementations, the memory 410 may provide storage of computer-readable instructions or other information in a non-transitory format.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems' of Alameda, Calif., USA; or other operating systems.

The memory 410 may include one or more of the modules described above as executing on the analysis device 120, such as the application analysis module 122, the application composition analysis module 124, or the application ownership analysis module 126. The memory 410 may also include any number of modules described in FIG. 1 as executing on other devices, such as one or both of the deployment module 112 and the source control module 116. In some implementations, the memory 410 may include a filter module 414. The filter module 414 may execute as a sub-component of the application analysis module 122, as shown in FIG. 4. Alternatively, the filter module 414 may execute as a separate module with respect to the application analysis module 122. The filter module 414 may apply one or more rules to determine a subset of the deployed files 104 to be analyzed for determining application composition or analysis. For example, the filter module 414 may apply rule(s) to determine that an analysis is to be performed on deployed files 104 that are in production, e.g., software modules or other files that are deployed in a production environment to provide services to end users or customers. As another example, the filter module 414 may apply rule(s) such that an analysis is performed on deployed files 104 associated with a particular team, group, organization, product, process, service, region, and so forth. In some cases, the filter module 414 may determine a subset of deployed files 104 to mitigate the possibility of inaccurate results in determining application composition and ownership. The memory 410 may also include one or more other modules 416, such as a user authentication module or an access control module to secure access to the analysis device 120, and so forth.

The memory 410 may include data storage 418 to store data for operations of the analysis device 120. The data storage 418 may comprise a database, array, structured list, tree, or other data structure, and may be a relational or a non-relational datastore. The data storage 418 may store data such as that described above, including one or more of the deployment metadata 108, the source control metadata 118, the application composition information 128, or the application ownership information 130. In some implementations the other metadata 132 may be employed to determine application composition or ownership. In such cases, the other metadata 132 may also be stored in the data storage 418. The other metadata 132 may include one or more of the following: ownership or assignment for digital certificate, cryptographic keys, or security credentials; load balancing configurations for load balancing among multiple host devices 102; issue tracking information, such as trouble tickets or bug tracking data; or file deployment or ownership information that has been manually collected from users. The data storage 418 may also store other data 420, such as user authentication information or access control data. In some implementations, at least a portion of the information stored in the data storage 418 may be stored externally to the analysis device 120, on other devices that may communicate with the analysis device 120 via the I/O interface(s) 406 or via the network interface(s) 408.

Figure 5:
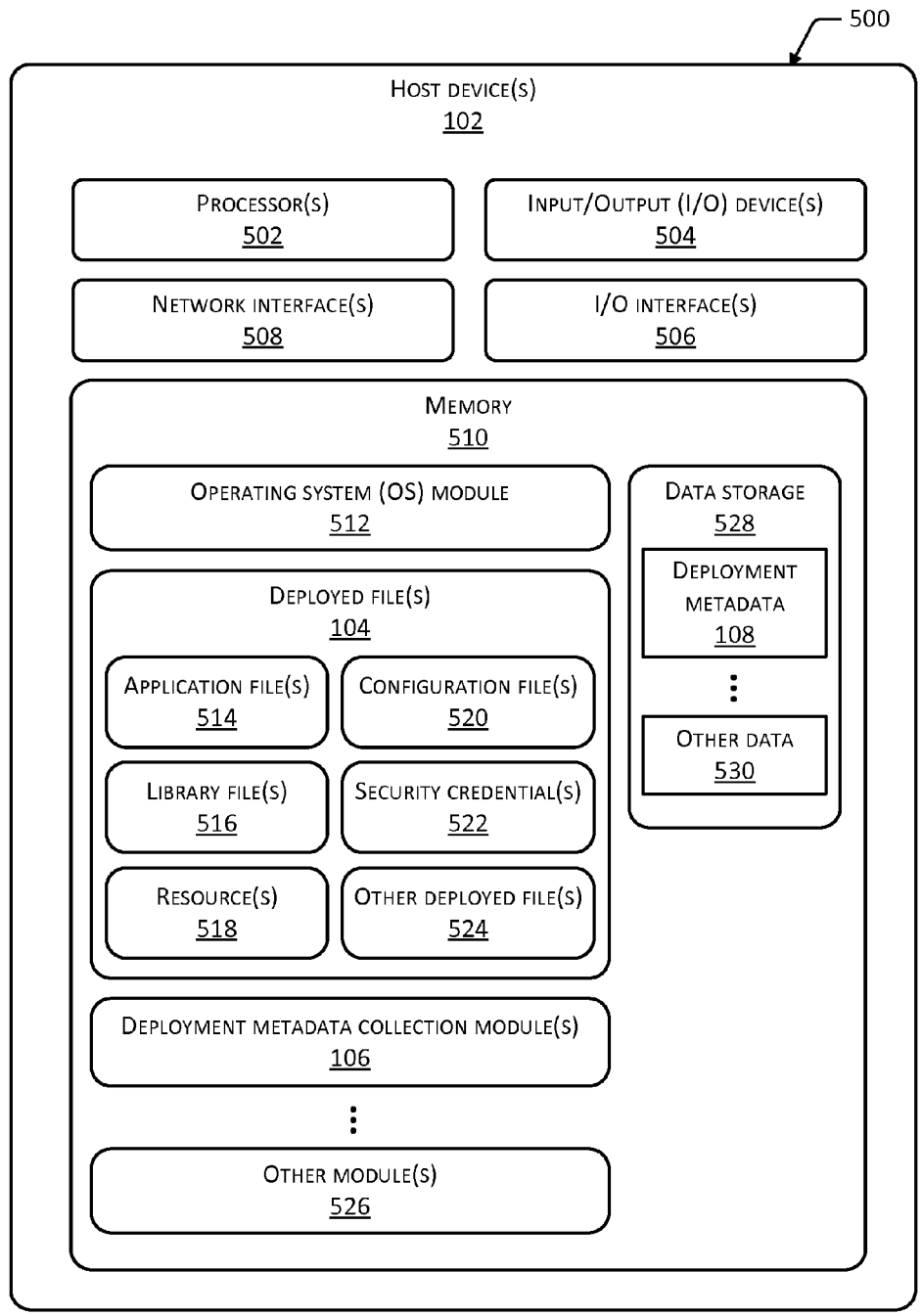
FIG. 5 depicts a block diagram of an example host device on which files of an application may be deployed and executed.

FIG. 5 depicts a block diagram 500 of an example of the host device(s) 102. As shown in the block diagram 500, the host device 102 may include one or more processors 502 configured to execute one or more stored instructions. The processor(s) 502 may comprise one or more cores, and may be hardware processor(s) such as one or more central processing units (CPUs). The host device 102 may include one or more I/O devices 504, one or more I/O interfaces 506, and one or more network interfaces 508 as described above respectively with reference to the I/O device(s) 404, the I/O interface(s) 406, and the network interface(s) 408.

The host device 102 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the components, modules, or files described above as present on the host device 102, such as the deployed file(s) 104 and the deployment metadata collection module(s) 106. The memory 510 may also include one or more other modules 526, such as a user authentication module or an access control module to secure access to the host device 102, and so forth.

As shown in FIG. 5, the deployed file(s) 104 may include various types of files that are deployed to the host device 102. The deployed file(s) 104 may include executable and non-executable files. The deployed file(s) 104 may include application file(s) 514, such as machine-executable binary files, executable script files, source code files for applications, and so forth. The deployed file(s) 104 may include library file(s) 516. The library file(s) 516 may include machine-executable binary libraries that may be loaded into memory during execution of an application, such as dynamic-linked libraries (DLLs). The library file(s) 516 may also include application programming interfaces (APIs). The deployed file(s) 104 may include resource(s) 518, such as text files, images, video files, graphics files, or other information that may be accessed by executing applications. The deployed file(s) 104 may include configuration file(s) 520 that describe a configuration of an application. The deployed file(s) 104 may include security credential(s) 522, such as certificates, access credentials, tokens, cryptographic keys, and so forth. The deployed file(s) 104 may also include other deployed files 524 that store any amount and type of data, in any format. The deployed file(s) 104 may include files that are compressed or uncompressed, and may include files that are encrypted or unencrypted.

The memory 510 may include data storage 528 to store data for operations of the host device 102. The data storage 528 may comprise a database, array, structured list, tree, or other data structure, and may be a relational or a non-relational datastore. The data storage 528 may store data such as that described above, including the deployment metadata 108. The data storage 528 may also store other data 530, such as user authentication information or access control data. In some implementations, at least a portion of the information stored in the data storage 528 may be stored externally to the host device 102, on other devices that may communicate with the host device 102 via the I/O interface(s) 506 or via the network interface(s) 508.

Figure 6:
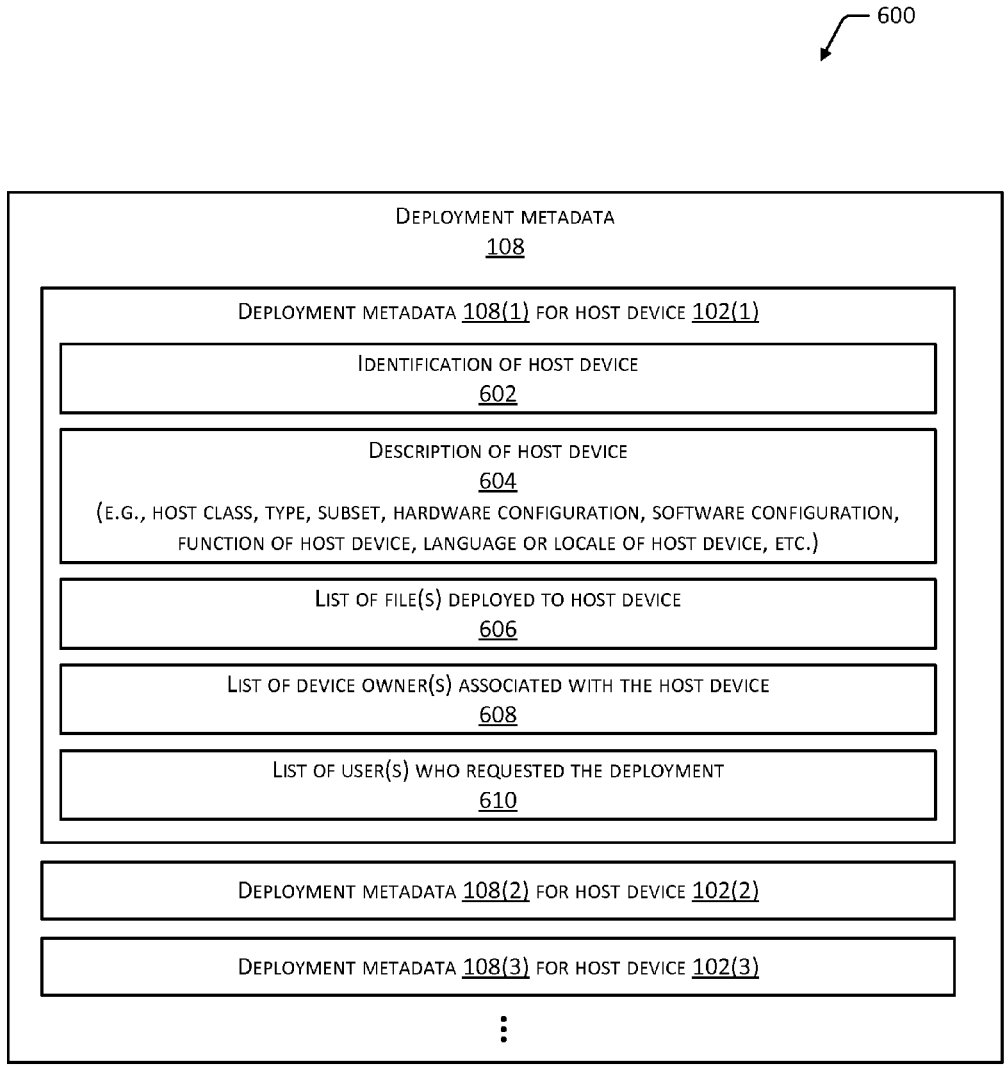
FIG. 6 depicts a schematic of example deployment metadata that may be employed in determining application composition and ownership.

FIG. 6 depicts a schematic 600 of an example of the deployment metadata 108 that may be employed in determining application composition and ownership. As shown in the example of FIG. 6, the deployment metadata 108 may include any number of sections that each describes a configuration of a host device 102. A section, such as the deployment metadata 108(1) for the host device 102(1), may include an identification of the host device 602 such as a hostname or address (e.g., IP address) of the host device 102(1). The deployment metadata 108(1) may also include a description of the host device 604. The description of the host device 604 may include any information regarding the host device 102, including but not limited to the host class, host type, host subset, hardware configuration, software configuration, function, locale, or supported language(s) of the host device 102(1). In some cases, the host device(s) 102 may be divided into any number of host classes, host types, or host subsets that are related or substantially similar with respect to the functionality they provide, or their software or hardware configuration.

The deployment metadata 108(1) may include a list of files deployed to the host device 606, such as the list of deployed files 104 that are currently deployed to or present on the host device 102(1). The deployment metadata 108(1) may include a list of device owners associated with the host device 608. Such device owners may be one or more individuals or teams of individuals who are at least partly responsible for the operations, maintenance, errors, or failures of the host device 102(1). In some cases, the deployment metadata 108(1) may include a list of users who requested the deployment 610, such as one or more users who requested the deployment of one or more deployed files 104 to the host device 102(1). Implementations also support the use of other types of deployment metadata 108 for determining application composition and ownership.

Figure 7:
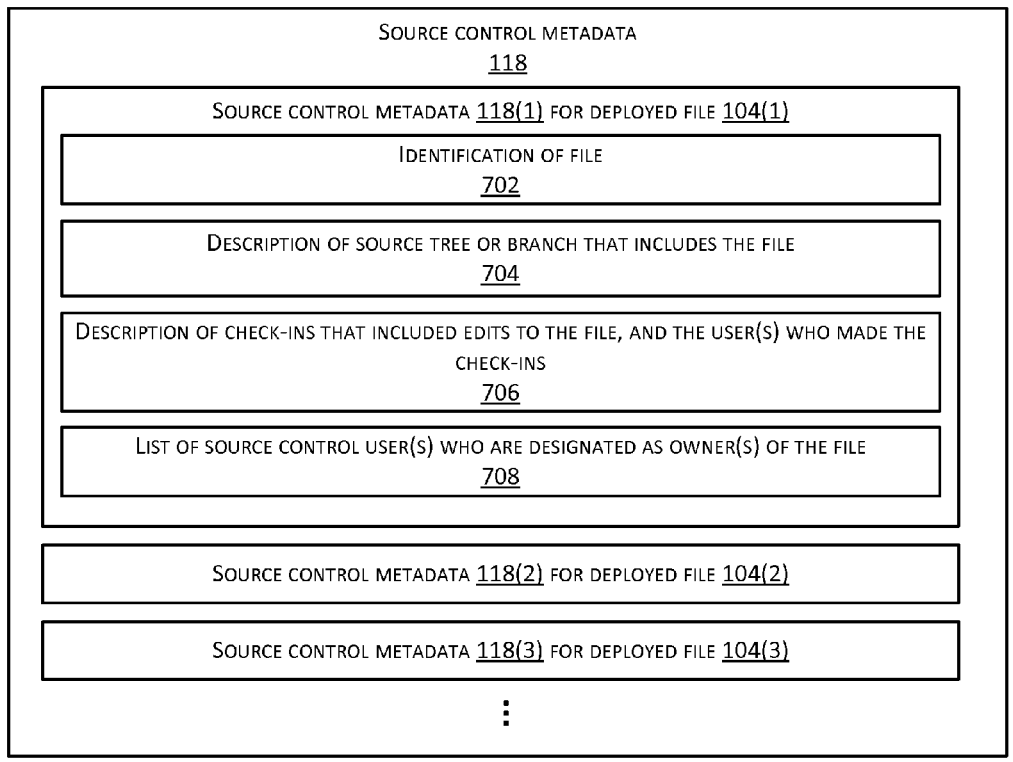
FIG. 7 depicts a schematic of example source control metadata that may be employed in determining application composition and ownership.

FIG. 7 depicts a schematic 700 of an example of the source control metadata 118 that may be employed in determining application composition and ownership. As shown in the example of FIG. 7, the source control metadata 118 may include any number of sections that each describes the state of a deployed file 104 stored using the source control module 116. A section, such as the source control metadata 118(1) for the deployed file 104(1), may include an identification of the file 702 such as a name, Uniform Resource Identifier (URI), Uniform Resource Locator (URL), or Uniform Resource Name (URN) of the deployed file 104. The source control metadata 118(1) may include a description of a source tree or branch that includes the file 704. In some cases, the files stored and tracked using the source control module 116 may be logically divided into multiple source trees or multiple source branches. In some cases, one version of a file may be included in one branch, and another, different version of the file may be included in another branch.

The source control metadata 118(1) may include a description of check-ins that included edits to the file, and the user(s) who made the check-ins 706. This information may include the date and time of the check-in, what changes (if any) were made to the checked in file through the check-in, and the one or more source control users who made the check-in. In some cases, the source control metadata 118(1) may also include a list of source control users who are designated as owners of the file 708. The owner(s) may be those user(s) who originally created or added the file to the source control system. Implementations also support the use of other types of source control metadata 118 for determining application composition and ownership.

Figure 8:
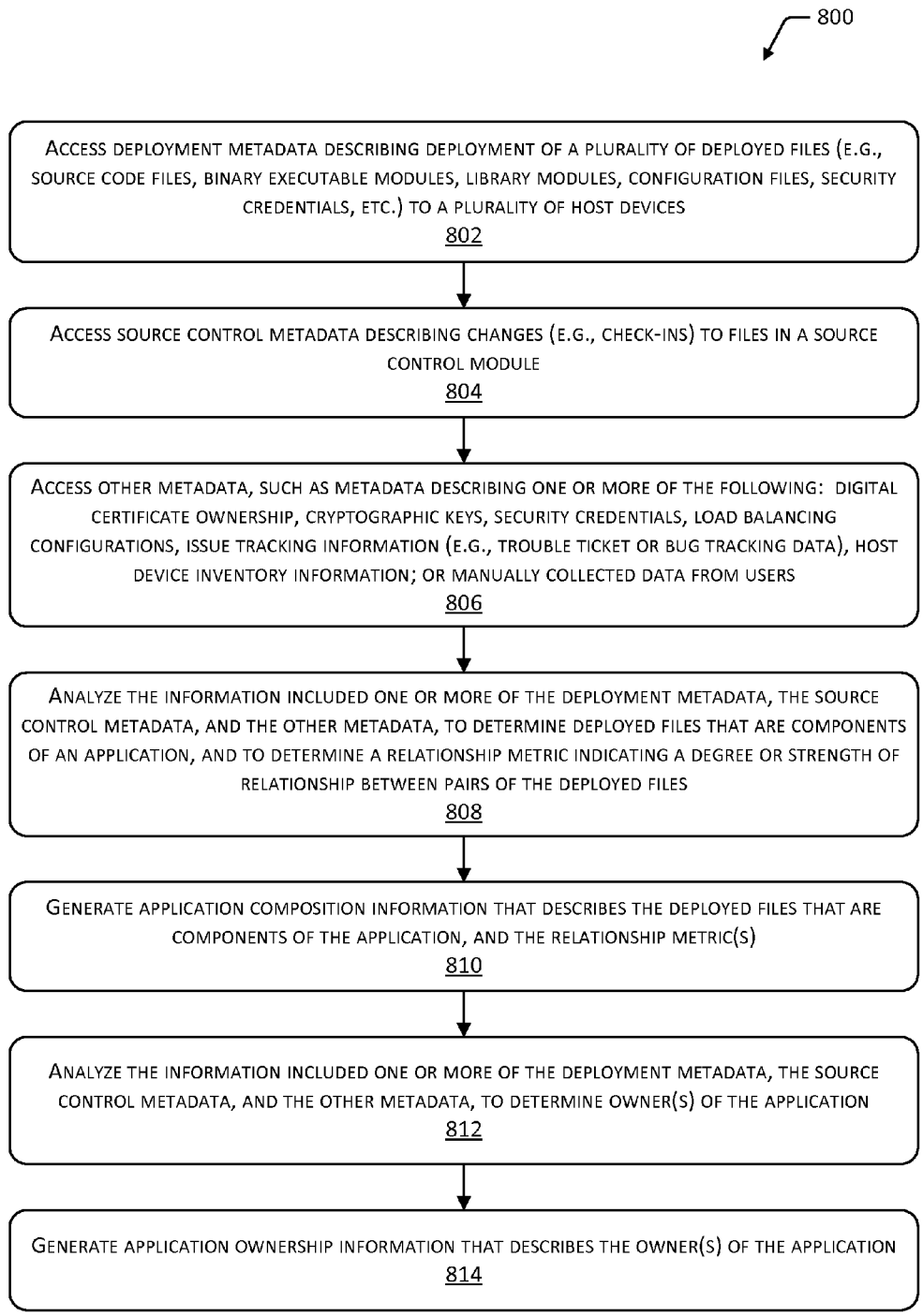
FIG. 8 depicts a flow diagram of a process for automatically determining application composition and ownership based on deployment metadata, source control metadata, or other types of metadata.

FIG. 8 depicts a flow diagram 800 of a process for automatically determining application composition and ownership based on the deployment metadata 108, the source control metadata 118, or the other metadata 132. One or more operations of the process may be performed by the application analysis module 122, the application composition analysis module 124, the application ownership analysis module 126, or by other modules executing on the analysis device(s) 120 or elsewhere.

At 802, the deployment metadata 108 is accessed. As described above with reference to FIG. 6, the deployment metadata 108 may describe the deployment of a plurality of deployed files 104 to a plurality of computing devices such as the host device(s) 102. At 804, the source control metadata 118 is accessed. As described above with reference to FIG. 7, the source control metadata 118 may describe check-ins made to change one or more source code files through the source control module 116. At 806, the other metadata 132 may be accessed. The other metadata 132 may include but is not limited to one or more of the following: ownership or assignment information for digital certificate, cryptographic keys, or security credentials; load balancing configurations for load balancing among multiple host devices 102; issue tracking information, such as trouble tickets or bug tracking data; or file deployment or ownership information that has been manually collected from users.

At 808, the information included in one or more of the deployment metadata 108, the source control metadata 118, or the other metadata 132 may be analyzed to determine a plurality of deployed files 104 that are included in the application 202, e.g., as components of the application 202. In some implementations, the analysis may also determine a relationship metric indicating a strength or degree of relationship between pairs of the plurality of deployed files 104. The analysis of the metadata to determine application composition is described further with reference to FIG. 9.

At 810, the application composition information 128 is generated. The application composition information 128 may describe the plurality of deployed files 104 that were determined to be components of the application 202, as determined at 808. The application composition information 128 may also include the relationship metric(s) that describe a strength or degree of relationship between pairs of the deployed files 104. In some implementations, the application composition information 128 may be presented in a graphical form, as shown in the example of FIG. 3.

At 812, the information included in one or more of the deployment metadata 108, the source control metadata 118, or the other metadata 132 may be analyzed to determine one or more owners of the application 202. The owners of the application 202 may include any number of individuals, or any number of groups (e.g., teams) that each include any number of individuals. Determination of application ownership is described further with reference to FIG. 10. At 814, the application ownership information 130 may be generated. The application ownership information 130 may describe the one or more owners of the application 202, as determined at 812.

Figure 9:
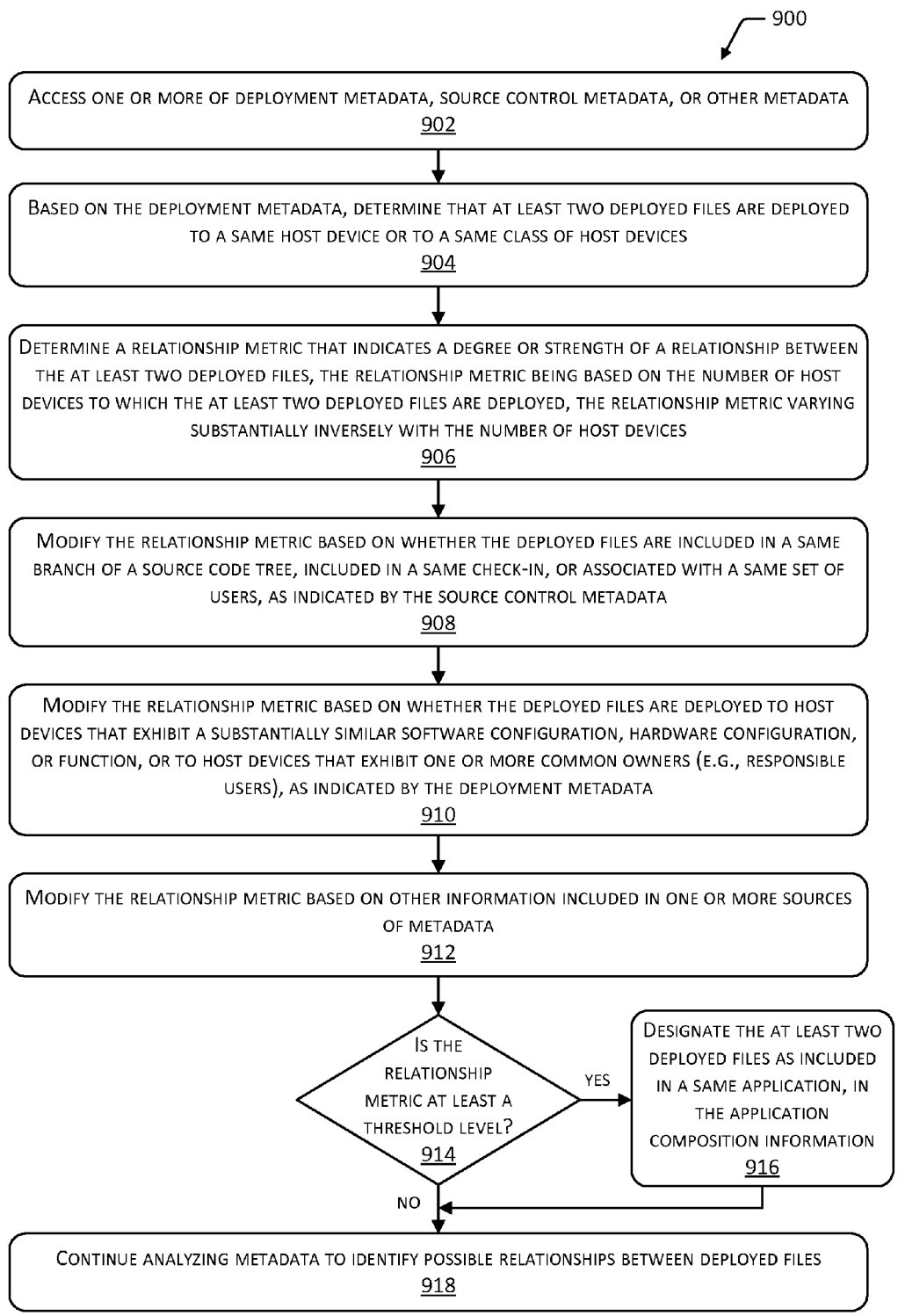
FIG. 9 depicts a flow diagram of a process for determining a relationship metric describing a degree of relationship between multiple deployed files, and for determining whether the deployed files are included in a same application based on the relationship metric.

FIG. 9 depicts a flow diagram 900 of a process for determining a relationship metric describing a strength of a relationship between multiple deployed files 104, and for determining whether the files are included in a same application 202 based on the relationship metric. One or more operations of the process may be performed by the application analysis module 122, the application composition analysis module 124, the application ownership analysis module 126, or by other modules executing on the analysis device(s) 120 or elsewhere.

At 902, one or more of the deployment metadata 108, the source control metadata 118, or the other metadata 132 are accessed, as described above. At 904, based on the deployment metadata 108 a determination is made that at least two deployed files 104 are deployed to a same computing device, such as a same host device 102. In some cases, a determination may be made that the at least two deployed files 104 are deployed to different computing devices that are part of a same class, type, or category of host devices 102. A host class of host devices 102 may include any number of host devices 102 that have a substantially similar hardware configuration, software configuration, or function. For example, a host class may include any number of host devices 102 that function as backend servers or content servers. As another example, a host class may include any number of host devices 102 that have a similar software configuration, but that are configured to host different versions of software that serve content to different geographical regions or natural language groups.

At 906, a relationship metric is determined that indicates a degree or strength of a relationship between the at least two deployed files 104. The relationship metric may be based at least partly on a number of the host devices 102 to which the at least two deployed files 104 are deployed. In some cases, the relationship metric may vary in a manner that is substantially inverse with the number of host devices 102 to which the at least two deployed files 104 are deployed. For example, if the at least two deployed files 104 are deployed to a single host device 102, the relationship metric may be determined to be high (e.g., a strong relationship). Alternatively, if the at least two deployed files 104 are deployed to a larger number of host devices 102, the relationship metric may be determined to be lower. Accordingly, the at least two deployed files 104 may be determined to be more strongly related if they are deployed to a common set of host devices 102 that are relatively few in number compared to a total number of host devices 102. In some cases, the relationship metric may be a numeric value along any scale from a minimum value (e.g., 0) to a maximum value (e.g., 100), and a higher numeric value may indicate a higher degree of relationship between the two or more deployed files 104.

At 908, the relationship metric may be modified based on whether the deployed files 104 are included in a same source code branch, a same source code tree, or a same source code check-in as indicated by the source control metadata 118. In some implementations, the relationship metric may also be modified based on whether the deployed files 104 are associated with a same set of one or more source control users who made check-ins to change the deployed files 104, or with a same set of one or more source control users who are designated as owners of the deployed files 104 in the source control system. In some implementations, an inference may be made that the deployed files 104 are more strongly related based on whether they are included in a same branch, tree, or check-in, or based on whether the same set of users have made changes to the deployed files 104 or are owners of the deployed files 104. In such cases, the relationship metric may be increased based on such evidence of relationship described in the source control metadata 118.

At 910, the relationship metric may be modified based on whether the deployed files 104 are deployed to a set of computing devices (e.g., host devices 102) that exhibit a substantially similar software configuration, hardware configuration, or function, such that the set of computing devices are part of a same host class, type, category, or group as described above with reference to 904. For example, the relationship metric may be modified based at least partly on a number of the host classes to which the deployed files 104 are deployed. In some cases, the relationship metric may vary in a manner that is substantially inverse relative to the number of host classes to which the deployed files 104 are deployed. For example, if the deployed files 104 are deployed to a single host class, the relationship metric may be adjusted upward. Alternatively, if the deployed files 104 are deployed to a larger number of host classes, the relationship metric may be adjusted downward. Further, in some implementations the relationship metric may be modified based on whether the deployed files 104 are deployed to host devices 102 or host classes that share a same computing device owner, as described in the deployment metadata 108.

At 912, the relationship metric may be modified based on other information included in one or more of the deployment metadata 108, the source control metadata 118, or the other metadata 132. Implementations support the determination of the relationship metric based on any information that may indicate a relationship or an association between two or more of the deployed files 104. Such information may include, but is not limited to, any of the following:

The deployed files 104 are deployed to a same set of two or more host devices 102, or to host devices 102 that are within a same host class, type, category, or group;

The deployed files 104 are included in a same source control branch, source control tree, source control merge, or source control check-in;

The deployed files 104 share one or more common owners in the source control system, or are associated with one or more common source control users who made check-ins to change the deployed files 104;

The deployed files 104 are deployed to a set of two or more host devices 102 that are associated with a same set of one or more computing device owners;

The deployed files 104 make remote calls or participate in other communications with a same set of one or more computing devices or processes, such as remote calls to a same remote data storage device, to common software modules, to a common API, and so forth;

The deployed files 104 are granted permission to employ a same set of one or more cryptographic keys, digital certificates, access credentials, tokens, or other information to ensure security or control access;

The deployed files 104 make remote calls or otherwise communicate with one another;

The deployed files 104 may receive and process similar data requests, as indicated by load balancing configuration information; or The deployed files 104 are indicated by one or more users as being part of a same application 202.

In some implementations, one or more of the types of evidence listed above may be weighted differently when determining their contributions to the relationship metric. For example, the determination that the deployed files 104 are deployed to a (e.g., small) number of the same host devices 102 may be weighted more highly in determining the relationship metric, relative to the determination that the deployed files 104 are part of a same source control branch or source control check-in.

At 914, a determination is made whether the relationship metric is at least a predetermined threshold level. If so, the process may proceed to 816 and designate the at least two deployed files 104 as included in the same application 202. Such a designation may be incorporated into the application composition information 128. If it is determined at 914 that the relationship metric is below the predetermined threshold level, the process may proceed to 918 and continue analysis the deployed files 104 to identify possible relationships among them. Although the example of FIG. 9 describes a relationship metric that varies from a lower value to a higher value to indicate relationship strength, implementations are not so limited. In some cases, a lower relationship metric may indicate a higher relationship strength and a higher relationship metric may indicate a lower relationship strength. In such cases, the determination at 914 may determine whether the relationship metric is at or below a predetermined threshold level.

Figure 10:
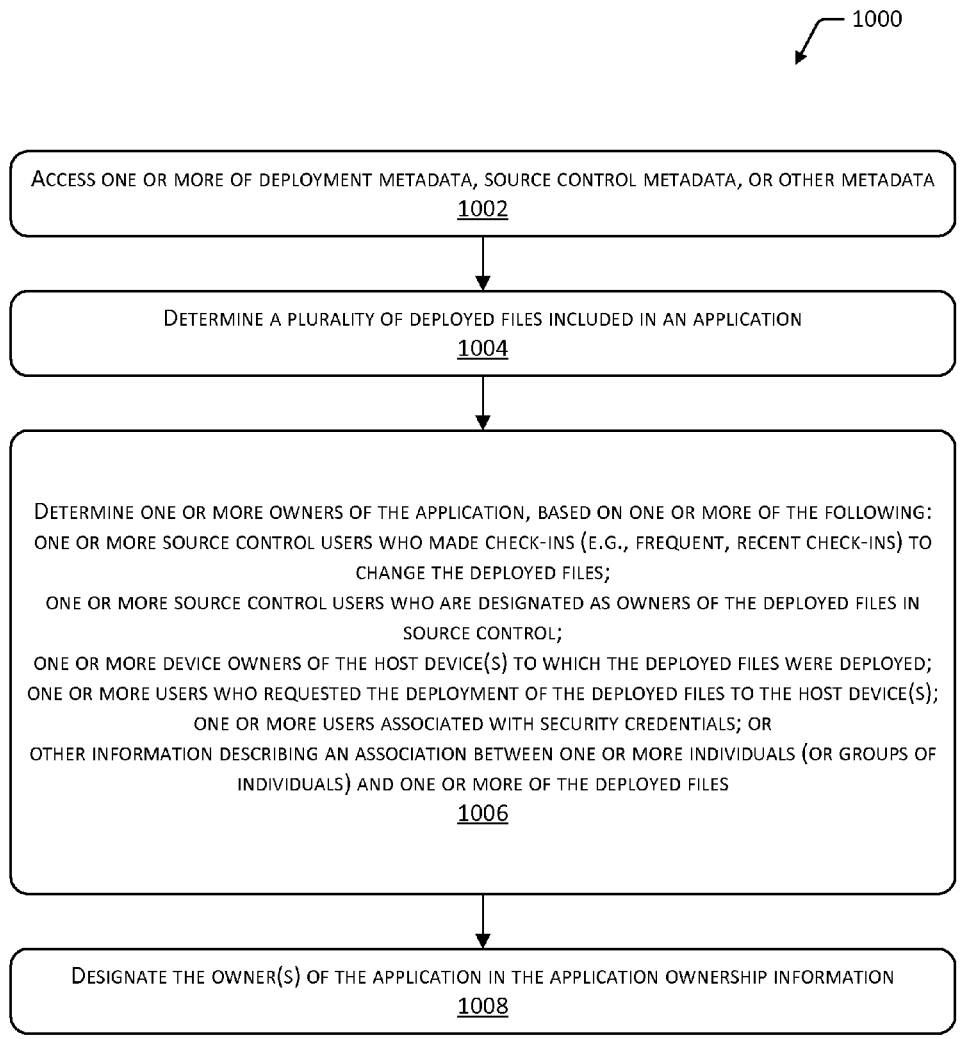
FIG. 10 depicts a flow diagram of a process for determining application ownership based on evidence in various types of metadata.

FIG. 10 depicts a flow diagram 1000 of a process for determining application ownership based on evidence provided by the various types of metadata described herein. One or more operations of the process may be performed by the application analysis module 122, the application composition analysis module 124, the application ownership analysis module 126, or by other modules executing on the analysis device(s) 120 or elsewhere.

At 1002, one or more of the deployment metadata 108, the source control metadata 118, or the other metadata 132 are accessed, as described above. At 1004, a determination is made of a plurality of deployed files 104 that are included in the application 202, as described above.

At 1006, the various types of metadata may be analyzed to determine one or more owners of the application 202, based on one or more users who are associated in some way with the plurality of deployed files 104 that comprise the application 202. Implementations support the determination of application ownership based on any information that may indicate an association between users and the deployed files 104. Such information may include, but is not limited to, any of the following:

One or more source control users who performed check-ins or other edits to change the deployed files 104, such as source control user(s) who made a number of check-ins to one or more deployed files 104 at a higher than threshold frequency within a predetermined, recent period of time, as described in the source control metadata 118;

One or more source control users who are designated, in the source control metadata 118, as owners or responsible parties with respect to the deployed files 104;

One or more computing device owners of the host device(s) 102 to which the deployed files 104 were deployed, as indicated by the deployment metadata 108;

One or more deployment requesting users who requested the deployment of the deployed files 104 to the host device(s) 102, as indicated by the deployment metadata 108;

One or more users who were the most recent users to touch, use, or modify the deployed files 104, as indicated in the source control metadata 118;

One or more users who are the only personnel associated with the deployed files 104, as the sole owners, users, or deployment requesters of the deployed files 104, as indicated by any type of metadata;

One or more users who are associated with security credentials (e.g., who are assigned security credentials), such as access credentials (e.g., login and password data), encryption keys, digital certificates, security tokens, and so forth, as described in the other metadata 132;

One or more users who are designated as responding to trouble tickets, bug reports, errors, failures, or operational alarms regarding the deployed files 104; or One or more users who themselves indicated that they are the owners of the deployed files 104 or the application 202.

Implementations may employ any of the types of information listed above, or other information, to determine one or more users who are associated with the deployed files 104 included in the application 202. Such evidence of ownership of each deployed file 104 may then be analyzed to determine one or more individuals or teams who own the application 202. In some implementations, one or more of the types of evidence listed above may be weighted differently when determining their contributions to ownership determination. For example, the determination that one or more users made frequent, recent check-ins of the deployed files 104 in a source control system may be weighted more highly in determining ownership, relative to the determination that the deployed files 104 were deployed to multiple host devices 102 that share a common computing device owner.

At 1008, the one or more owners determined at 1006 may be designated in the application ownership information 130. In some implementations, the application ownership information 130 may list one or more individuals or teams that have been determined as likely owners of the application 202. The application ownership information 130 may also list, for one or more individuals or teams, a likelihood metric or confidence level indicating a level of confidence in the ownership determination. In some cases, such a confidence level may be numeric and may range from a low value to a high value. Alternatively, the confidence level may be a more subjective measure of confidence, such as "high," "medium," or "low" confidence. In cases, where a possible conflict in ownership has been detected, such as a determination of two or more parties that are substantially likely to be owners of the application 202, the application ownership information 130 may describe the conflicting ownership determination enabling a manual resolution. In cases where no owner may be automatically determined for the application 202, the application ownership information 130 may indicate a default owner as one or more individuals or teams.

In some implementations, the automatic determination of application composition and ownership may be incrementally performed periodically to ensure that the application composition information 128 and the application ownership information 130 is up to date. For example, the processes described above may operate in response to a determination that a new deployed file 104 has been added to the plurality of deployed files 104 deployed to the host devices 102. The new deployed file 104 may be analyzed as described above to determine which application 202, if any, it is likely to be a component of. The application ownership information 130 for the application 202 may likewise be reanalyzed and updated based on the information regarding one or more users who are associated with the new deployed file 104. Implementations may then automatically notify the owner(s) of the application 202 that the new deployed file 104 may be a new component of the application 202, and request confirmation from the owners that the new deployed file 104 is a component of the application 202.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium may be one or more of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine readable signal (in compressed or uncompressed form). Examples of machine readable signals, whether modulated using a carrier or unmodulated, include but are not limited to signals that a computer system or machine hosting or running a computer program can be configured to access, including signals transferred by one or more networks. For example, the transitory machine readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
accessing deployment metadata describing deployment of a plurality of files to a plurality of computing devices, the deployment metadata further describing one or more computing device owners associated with one or more of the plurality of computing devices;
based on the deployment metadata, determining that at least two files of the plurality of files are deployed to a subset of the plurality of computing devices;
determining a relationship metric indicating a relationship between the at least two files, the relationship metric based at least partly on a number of the subset of computing devices to which the at least two files are deployed, the relationship metric varying substantially inversely to the number of computing devices to which the at least two files are deployed in the subset of computing devices, wherein the at least two files deployed to the subset of computing devices are more strongly related when deployed to a common set of computing devices that are fewer in number compared to a total number of the plurality of computing devices;
based on the relationship metric being above a threshold level, determining that the at least two files are components of an application;
accessing source control metadata describing changes to source code files corresponding to the at least two files, the changes recorded using a source control module that generates the source control metadata, the source control metadata further describing one or more source control users who made the changes; and
determining one or more application owners who are at least partly responsible for the application, based on the one or more source control users who made the changes and the one or more computing device owners associated with the subset of computing devices.

2. The method of claim 1, wherein:
the source control metadata further describes one or more relationships among the plurality of files, including whether the source code files corresponding to the at least two files are included in a same branch of a source tree; and
the determining of the relationship metric is further based on whether the source code files are included in the same branch, as described in the source control metadata.

3. The method of claim 1, wherein:
the deployment metadata further describes one or more deployment requesting users who requested the deployment of the at least two files to the subset of computing devices; and
the determining of the one or more application owners is further based on the one or more deployment requesting users.

4. The method of claim 1, wherein the plurality of files includes one or more of:
a binary executable module;
a binary library;
a resource file;
a configuration file; or
a security credential.

5. A system, comprising:
at least one computing device configured to implement one or more services, wherein the one or more services are configured to:
access deployment metadata describing deployment of a plurality of files to a plurality of computing devices;

based on the deployment metadata, determine that at least two files of the plurality of files are deployed to a common subset of the plurality of computing devices;
determine a relationship metric indicating a relationship between the at least two files, the relationship metric based at least partly on a number of computing devices in the subset of computing devices to which the at least two files are commonly deployed;
based on the relationship metric being above a threshold level, determine that the at least two files are components of an application; and
determine one or more owners of the application based on source control metadata associated with the at least two files;
wherein the relationship metric varies substantially inversely with the number of computing devices in the subset of computing devices to which the at least two files are deployed.

6. The system of claim 5, wherein the at least two files deployed to the subset of computing devices are more strongly related when deployed to a common set of computing devices that are fewer in number compared to a total number of the plurality of computing devices.

7. The system of claim 5, wherein the determining that the at least two files are components of the application is further based on the at least two files being deployed to one of the plurality of computing devices.

8. The system of claim 5, wherein the determining that the at least two files are components of the application is further based on the at least two files being deployed to the subset of computing devices that exhibit one or more of:
a substantially similar software configuration, as described by the metadata;
a substantially similar hardware configuration, as described by the metadata; or
a substantially similar function, as described by the metadata.

9. The system of claim 5, wherein:
the metadata further describes one or more computing device owners associated with one or more of the plurality of computing devices; and
the one or more services are further configured to determine one or more application owners associated with the application, the one or more application owners being determined based at least partly on the one or more computing device owners associated with the subset of computing devices to which the at least two files are deployed.

10. The system of claim 5, wherein:
the metadata further describes one or more deployment requesting users who requested the deployment of the at least two files to the subset of computing devices; and
the one or more services are further configured to determine one or more application owners associated with the application, the one or more application owners being determined based at least partly on the one or more deployment requesting users.

11. The system of claim 5, wherein:
the metadata further describes changes to source code files corresponding to the at least two files, the changes recorded using a source control module;
the metadata further describes one or more source control users who made the changes; and
the one or more services are further configured to determine one or more application owners associated with the application, the one or more application owners being determined based at least partly on the one or more source control users who made the changes to the source code files.

12. The system of claim 11, wherein the one or more application owners are determined based at least partly on the one or more source control users who made a highest number of changes to the source code files within a period of time.

13. The system of claim 11, wherein:
the metadata further describes one or more relationships among the plurality of files, including whether the source code files corresponding to the at least two files are included in a same branch of a source tree; and
the determining of the relationship metric is further based on whether the source code files are included in the same branch, as described in the metadata.

14. One or more non-transitory computer-readable media storing instructions which, when executed by at least one processor, instruct the at least one processor to perform actions comprising:
accessing deployment metadata describing deployment of a plurality of files to a plurality of computing devices;
based on the deployment metadata, determining that at least two files of the plurality of files are deployed to a common subset of the plurality of computing devices;
determining a relationship metric indicating a relationship between the at least two files, the relationship metric based at least partly on a number of computing devices in the subset of computing devices to which the at least two files are commonly deployed;
based on the relationship metric being above a threshold level, determine that the at least two files are components of an application;
determining one or more owners of the application based on source control metadata associated with the at least two files; and
wherein the source control metadata further describes one or more relationships among the plurality of files, including whether the source code files corresponding to the at least two files are included in a same branch of a source tree, the determining of the relationship metric is further based on whether the source code files are included in the same branch, as described in the source control metadata.

15. The one or more non-transitory computer-readable media of claim 14, the actions further comprising:
generating application composition information that describes:
the at least two files determined to be components of the application; and
the relationship metric indicating the relationship between the at least two files; and
providing the application composition information.

16. The one or more non-transitory computer-readable media of claim 15, wherein the application composition information includes a graphical depiction of the relationship between the at least two files.

17. The one or more non-transitory computer-readable media of claim 14, wherein:
the at least two files are executable files compiled to execute on the subset of computing devices; and
the source control metadata further describes changes to source code files that are compiled to generate the at least two files, the changes recorded using a source control module.

18. The one or more non-transitory computer-readable media of claim 17, wherein:
the metadata further describes one or more source control users who made the changes to the source code files that are compiled to generate the at least two files; and
the determining of the relationship metric is further based on whether the changes to the source code files were made by a same source control user.

19. The one or more non-transitory computer-readable media of claim 14, wherein the plurality of files includes one or more of:
a compiled executable file;
a library;
a source code file;
an application programming interface (API);
a program resource;
a configuration file; or
a security credential.

20. The one or more non-transitory computer-readable media of claim 14, wherein the relationship metric varies substantially inversely with the number of computing devices in the subset of computing devices to which the at least two files are deployed, wherein the at least two files deployed to the subset of computing devices are more strongly related when deployed to a common set of computing devices that are fewer in number compared to a total number of the plurality of computing devices.

* * * * *